United States Patent
Hamel-Nyhus et al.

[11] Patent Number: 6,145,932
[45] Date of Patent: Nov. 14, 2000

[54] BABY BLANKET WITH RECEIVING COMPARTMENT FOR USE IN CAR SEAT

[76] Inventors: Paulette Hamel-Nyhus, 2015 Euclid Ave, #209, Long Beach, Calif. 90803; Doreen Jean Hamel, P.O. Box 1655, Grand Centre, Alberta, Canada, T0AIT0

[21] Appl. No.: 08/229,650

[22] Filed: Apr. 19, 1994

[51] Int. Cl.[7] .................................................. A47C 31/00
[52] U.S. Cl. .................... 297/465; 297/219.12; 297/485; 5/494
[58] Field of Search ..................................... 297/465, 485, 297/219.12; 5/482, 485, 494; 2/69, 69.5, 84

[56] References Cited

U.S. PATENT DOCUMENTS

| | | | |
|---|---|---|---|
| 3,477,065 | 11/1969 | Hoover | 2/69.5 |
| 3,962,738 | 6/1976 | Menditto | 5/494 |
| 4,125,903 | 11/1978 | Farrell . | |
| 4,172,300 | 10/1979 | Miller | 5/494 X |
| 4,597,121 | 7/1986 | Bouma . | |
| 4,695,092 | 9/1987 | Hittie | 297/219.12 |
| 4,775,183 | 10/1988 | Tsuge et al. | 297/219.12 |
| 4,817,836 | 4/1989 | Bates . | |
| 4,897,885 | 2/1990 | Lunt . | |
| 4,993,090 | 2/1991 | Ranalli . | |
| 5,046,204 | 9/1991 | Mohler | 5/494 X |
| 5,058,226 | 10/1991 | Crosby | 5/482 X |
| 5,238,293 | 8/1993 | Gibson | 297/485 X |
| 5,243,724 | 9/1993 | Barnes | 297/465 X |

FOREIGN PATENT DOCUMENTS 1251001  3/1989  Canada .

*Primary Examiner*—Laurie K. Cranmer
*Attorney, Agent, or Firm*—Knobbe, Martens, Olson & Bear, LLP

[57] ABSTRACT

A baby blanket adapted for use in a child car seat having a restraint system. The blanket has a receiving compartment located on its front surface, for receiving and holding the legs and torso of an infant or small child. The blanket comprises a front sheet and a rear sheet, sewn together to form the compartment. The rear sheet has three to five apertures located to permit the straps or restraining harnesses of a child car seat to pass through the rear sheet and buckle around the child. The front sheet is sewn to the rear sheet along three sides to form an open-topped compartment for receiving and holding the child. The front sheet may additionally have a recloseable opening for further aiding insertion of the child into the compartment.

10 Claims, 5 Drawing Sheets

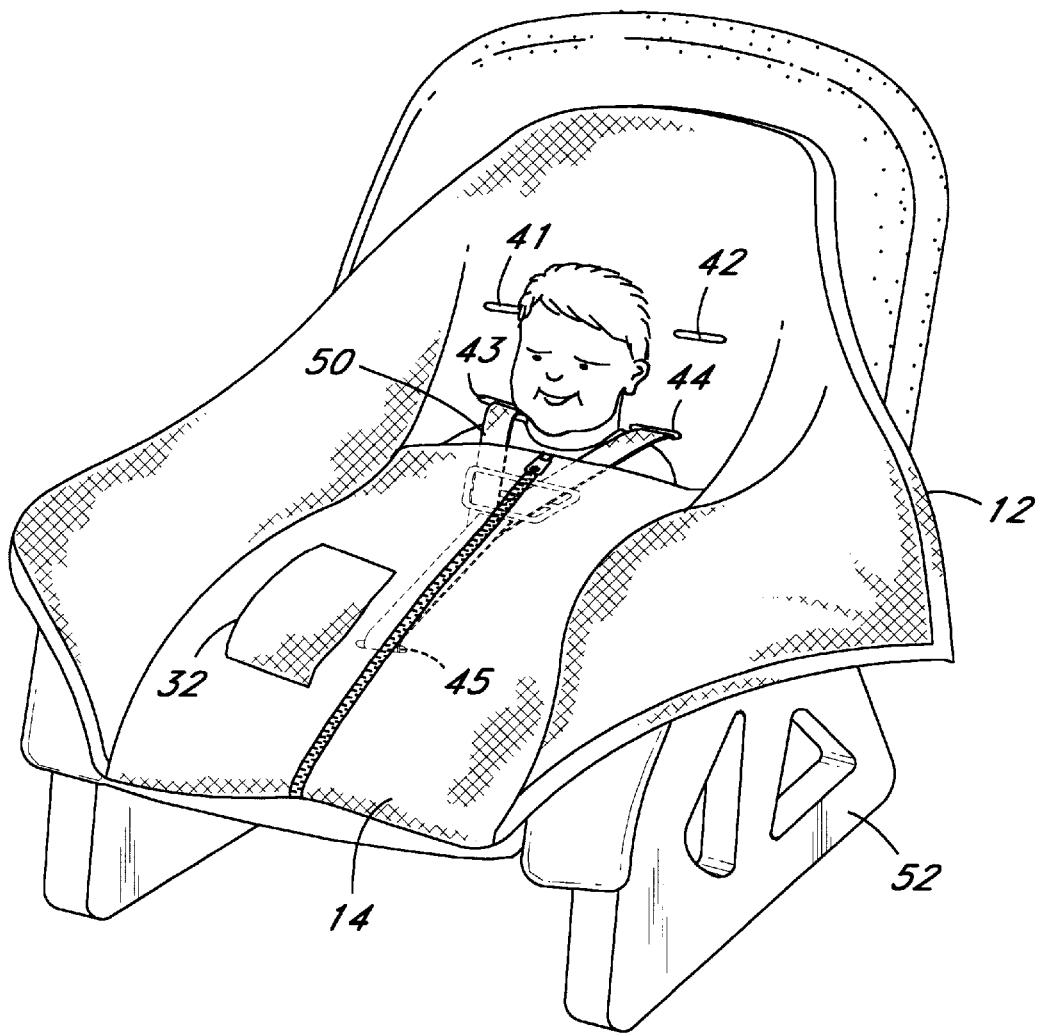

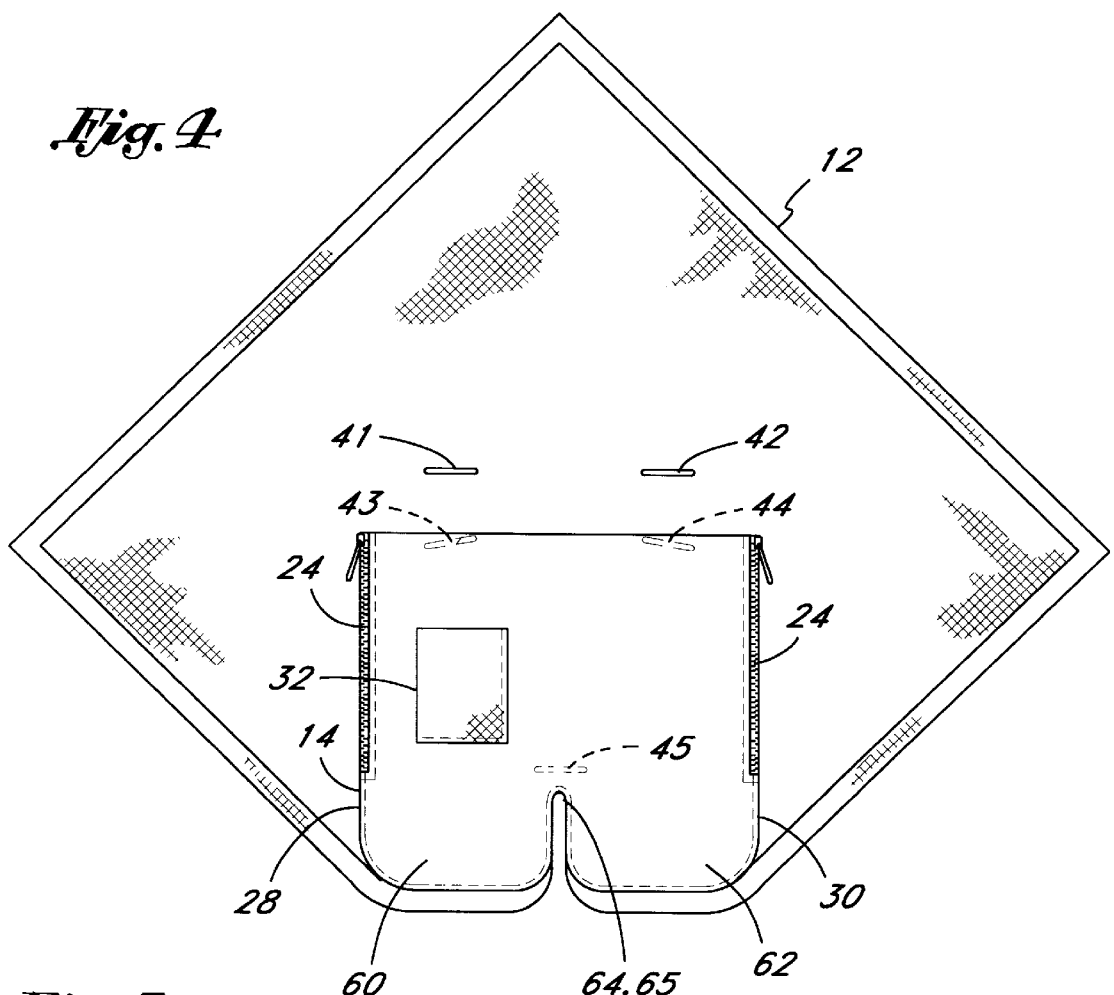
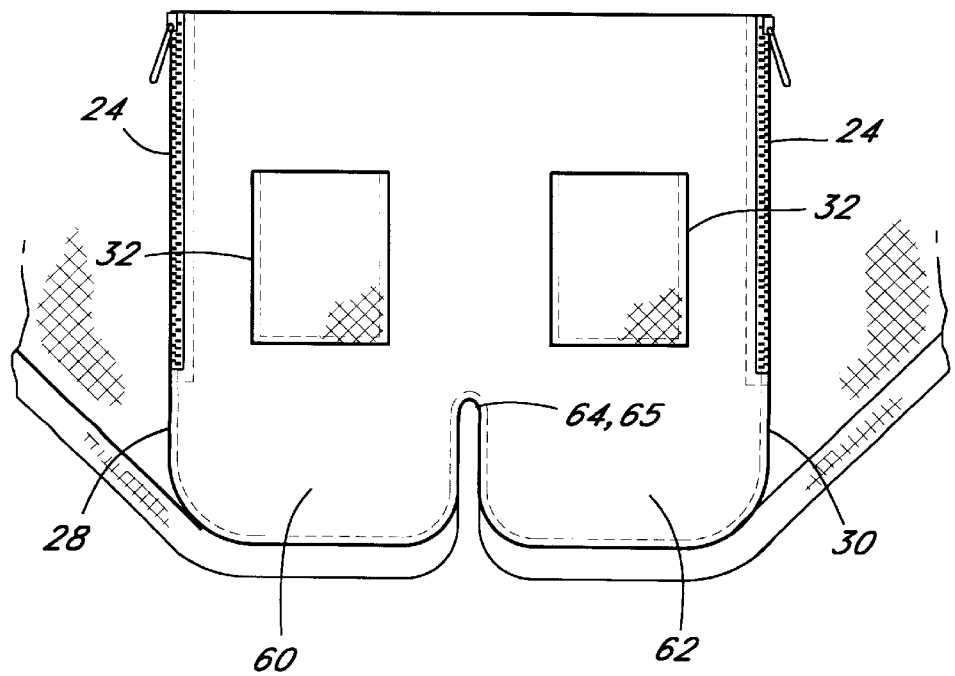

BABY BLANKET WITH RECEIVING COMPARTMENT FOR USE IN CAR SEAT

FIELD OF THE INVENTION

The present invention relates to an improvement in baby and infant blankets. More specifically, the invention relates to a baby blanket having an integral compartment for containing and holding a baby, and which is adapted for use with baby or infant car seats having a restraint system.

BACKGROUND OF THE INVENTION

The United States and many other countries require the use of a car seat with a special restraint system for transporting children in a vehicle. Child car seat restraint systems restrain the child's torso in the car seat while leaving the head and limbs free to move naturally. In order to provide proper restraint, the restraining members must be tightly fitted to the child's torso.

Most child car seats have a restraint system, or harness, having either three or five anchor points. In the three-point system, a strap or post is anchored to the seat, and extends upward between the child's legs, terminating at the crotch. Two more straps or bars are anchored to the backrest of the seat and extend over the left and right shoulders of the child. The three harness elements are joined by buckles or clasps in front of the child's torso. The lengths of the harness elements are adjusted to hold the child's torso tightly in the car seat, while permitting free movement of the head and limbs.

There are several variations of this basic three-point system. For example, the harness may have a T-shaped pad at the intersection of the three harness elements. Additional means may be provided for conveniently positioning the shoulder straps. The buckle or clasp may be located at the base of the crotch. U.S. Pat. Nos. 4,632,460, 4,655,506, 4,738,483, which are herein incorporated by reference, describe typical three-point restraint systems.

In a five-point system, additional fourth and fifth straps or bars are anchored to the seat or backrest of the car seat, and extend around the lower portion of the child's torso, below the arms. These straps or bars are joined with the first three harness elements in front of the child's torso. The extra straps provide added restraint against lateral movement of the torso, while permitting free movement of the head and limbs. U.S. Pat. Nos. 4,679,852 and 4,685,741, which are herein incorporated by reference, describe five-point restraint systems.

Proper restraint of a child is easily accomplished in a three- or five-point restraint system when the child wears normal, fitted clothing. However, young children are often swaddled in blankets or bunting to keep them warm. Newborn children are particularly vulnerable to heat losses, because they are not fully able to regulate their body temperature. Unless a newborn infant is kept warm, she may lose heat faster than she can replace it. The lost heat depletes the infant's essential stores of fat and glycogen, energy sources which are better used for normal growth and development.

Typical swaddling blankets are not easily used in conjunction with a child car seat having a restraint system. Blankets get in the way of the harness elements, and must be folded and tucked around the harness once it is in place. The blanket is likely to come loose during the ride; or if it is so tightly placed that it will not come loose, it is probably uncomfortable for the child.

Typical swaddling blankets are also difficult to wrap around a baby, even when the baby is not confined to a car seat. Usually one must spread the blanket open on a flat surface, place the baby on top, and then wrap the blanket around the baby. Wrapping and enclosing a baby in this manner requires time and effort, and is often awkward and inconvenient, especially when a flat surface is unavailable. Moreover, it is often easy for a baby to wriggle and cause the blanket to come loose.

U.S. Pat. No. 4,125,903 to Farrell describes a blanket having an integral holding compartment for a baby. The compartment is formed by an additional triangular layer of cloth sewn to two adjacent sides of a rectangular blanket. The diagonal edge across the blanket is open, so that a pouch is formed, into which the torso of a baby can be inserted. The blanket can then be further wrapped around the child, minimizing her ability to wriggle free. However, the Farrell blanket is not adaptable for use with a child car seat. In particular, because the torso of the child is firmly held inside the compartment, it would be extremely difficult to pass the restraint system of a child car seat through the child's legs.

U.S. Pat. No. 4,993,090 to Ranalli describes a swaddling blanket having slits through which the harness elements of a three- or five-point child car seat restraint system can pass. The restraint harnesses can thus be passed through the slits of the Ranalli blanket and then fastened around the child. The blanket can then be wrapped around the child. However, the Ranalli blanket suffers from the same disadvantages as regular swaddling blankets, in that it is easy for a wriggling child to work the blanket loose.

There thus remains a need for a swaddling blanket, adapted for use with a child car seat having a restraint system, that can firmly hold a wriggling infant.

SUMMARY OF THE INVENTION

In order to overcome the problems and limitations discussed above, this invention provides a baby cover or blanket having a receiving compartment, and which is adapted for use with a child car seat having a restraint system.

The blanket is comprised of a front sheet and a rear sheet, which when sewn together form a compartment between them adapted to hold the legs and torso of an infant or small child. The rear sheet is generally diamond-shaped, truncated along its bottom corner, and larger than the front sheet. The front sheet is rectangular, as wide as the bottom truncated edge of the rear sheet, and tall enough to encompass the legs and most of the torso of the infant or child. The front sheet is sewn along its two vertical sides and its bottom edge to the rear sheet, forming an open-topped compartment for receiving and holding the baby.

The front sheet is equipped with a recloseable opening, which may be opened and refastened with a zipper, buttons, snaps, laces, or similar devices. The opening provides an additional means for inserting the baby into the receiving compartment.

The rear sheet is equipped with three to five apertures for admitting the straps or restraining harnesses of a child car seat. The blanket and child can thus be placed on a child car seat, and the restraining straps pulled through the apertures and buckled around the child. The blanket can then be further wrapped around the child. The receiving compartment prevents the child from wriggling loose.

DESCRIPTION OF THE DRAWINGS

FIG. 3 is a perspective view of the blanket of the first preferred embodiment, showing its use with a child car seat having a restraint system.

FIG. 4 is a front view of a second preferred embodiment of the present invention, illustrating the blanket and receiving compartment, and a child held within the compartment.

FIG. 5 is an enlargement of the compartment of the second preferred embodiment, viewed from the front.

DETAILED DESCRIPTION OF THE PREFERRED EMBODIMENTS

Figure 1:
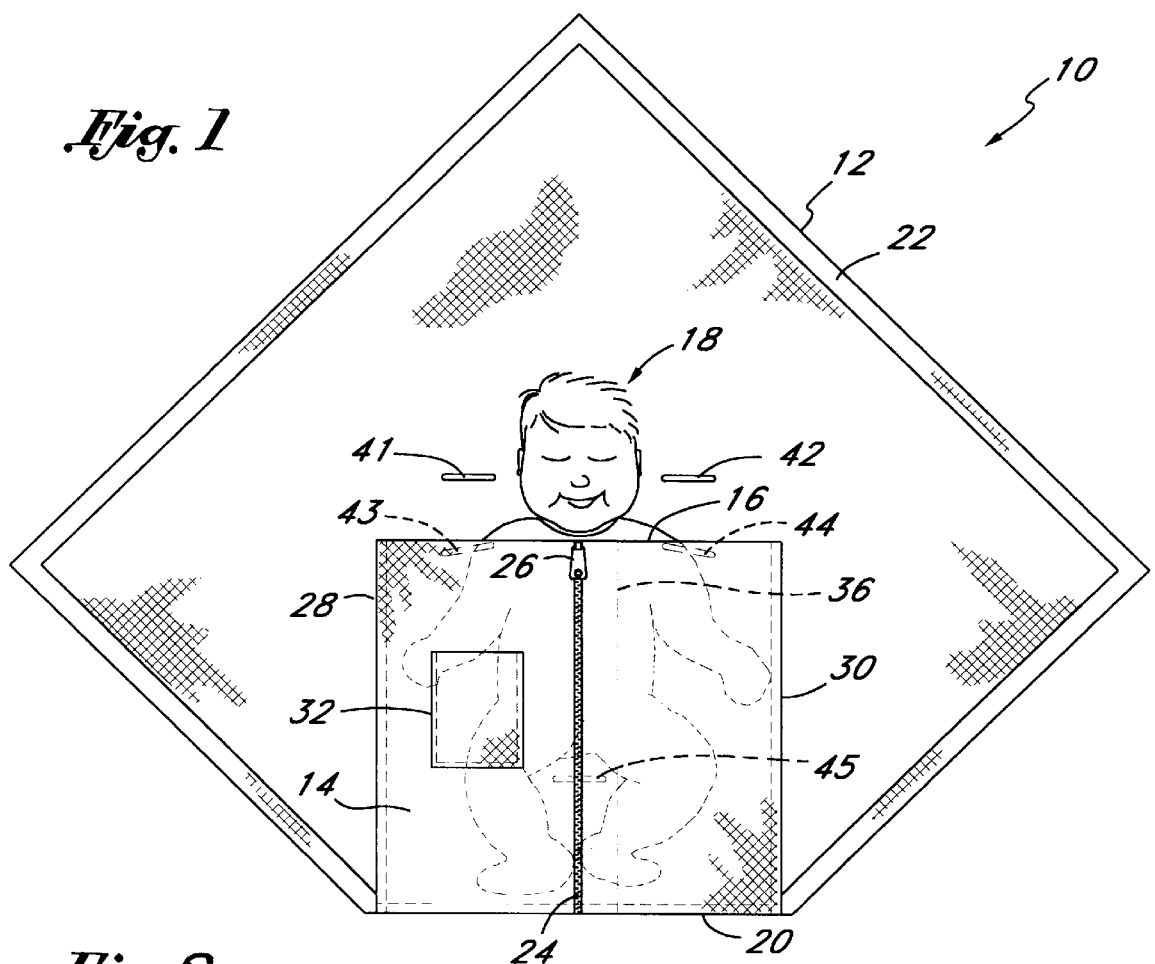
FIG. 1 is a front view of a first preferred embodiment of the present invention, illustrating the blanket and receiving compartment, and a child held within the compartment.

FIG. 1 illustrates a first preferred embodiment of a baby receiving blanket 10 in accordance with the present invention. In general, the blanket 10 comprises a rear sheet 12 and a front sheet 14, which between them form a receiving compartment 16 for holding a baby 18. The sheets 12, 14 may be of any suitable cloth or fabric, and are preferably made of a soft, multiple-layer quilted fabric, having a heat-retaining filling of soft down or cotton fiber. Alternatively, for warmer weather use, the sheets 12, 14 may be cut from a single layer of soft cloth, such as cotton.

The rear sheet 12 may be of any size or shape capable of substantially enclosing the baby 18 when the sheet 12 is wrapped around him. In the first preferred embodiment, as shown in FIG. 1, the rear sheet is square or diamond-shaped, each side approximately 36 inches long, having one corner truncated to form a bottom edge 20. The bottom edge 20 should be long enough to completely encompass the width of the baby 18 when the baby 18 is held within the compartment 16 as shown in FIG. 1. In the first preferred embodiment, the bottom edge 20 is approximately 17 inches long.

The rear sheet 12 may further have a sewn or decorative border 22 on its edges. The border 22 provides strength as well as aesthetic appeal to the blanket 10.

The front sheet 14 is advantageously of a size and shape smaller than the rear sheet 12, and adequate to comfortably and safely retain the legs and torso of the child 18 when the front sheet 14 is attached to the rear sheet as described below. Thus, the front sheet is advantageously sized to form a pocket or pouch which snugly encloses the lower body of the infant. In this configuration, the front sheet 14 is generally about one-eighth to about one-fourth of the area of the rear sheet 12. Alternatively, and preferably where intended to be used with a stroller, the front sheet 14 may be tall enough to encompass only the child's 18 legs. In the preferred embodiment shown in FIG. 1, the front sheet 14 is rectangular, approximately as wide as the bottom edge 20 of the rear sheet 12 is long, and approximately 14 inches high.

The front sheet 14 is sewn or otherwise firmly attached to the rear sheet 12, as shown in FIG. 1, in order to form an open-topped compartment 16 for receiving a baby 18 between the front sheet 14 and the rear sheet 12. In the preferred embodiment the front sheet 14 is rectangular, and therefore it is sewn to the rear sheet 12 along its two vertical sides 28, 30 and along the bottom edge 20 of the rear sheet 12, forming a rectangular compartment 16. Of course, many other configurations of front sheet 14 and compartment 16 are possible.

Figure 2:
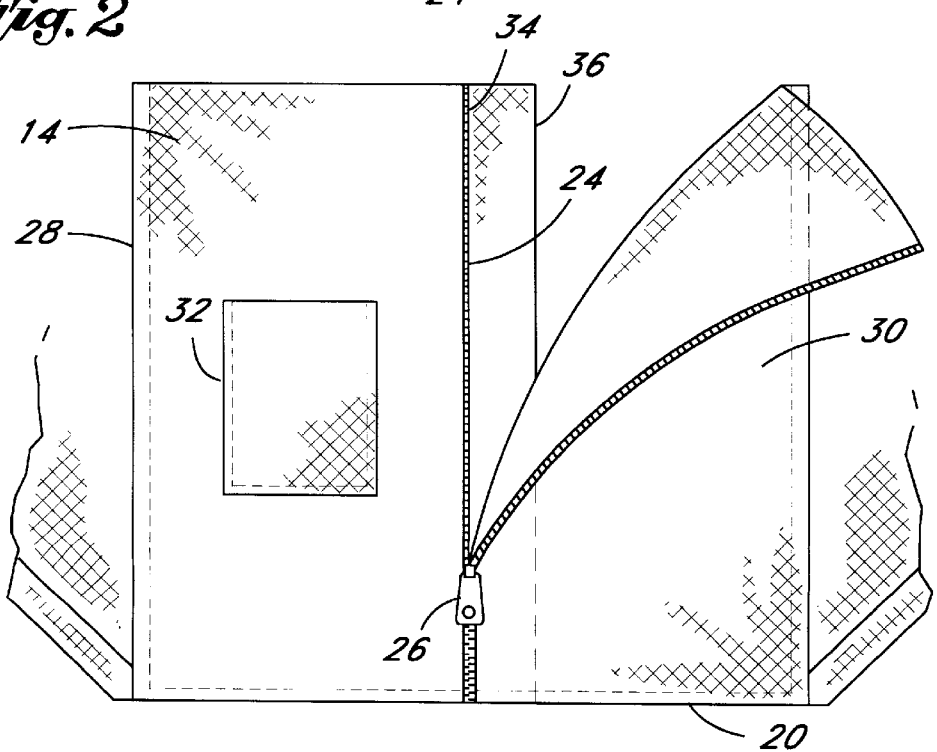
FIG. 2 is an enlargement of the compartment of the first preferred embodiment, viewed from the front.

As shown more clearly in FIG. 2, the front sheet 14 may also include a recloseable opening 24 to aid the user in placing the baby 18 within the receiving compartment 16. The opening 24 is preferably fitted with a fastening device 26 such as buttons, snaps, laces, Velcro, or most preferably a zipper. In the preferred embodiment shown in FIG. 2, a single vertical opening 24 is located in the center of the front sheet 14. However, other locations for the opening 24 are possible, such as along either side 28, 30 of the front sheet 14, or diagonally across the front sheet 14. Alternatively, two openings 24 could be located, for example, along both sides 28, 30 of the front sheet 14. Many other configurations of the recloseable opening 24 are obviously possible.

When using a zipper 26 to fasten the recloseable opening 24, it is preferable that one edge 34 of the opening be fitted with a short extension 36 of fabric to prevent the baby's 18 skin or clothing from being caught in the zipper 26. In the embodiment shown in FIG. 2, this extension 36 is approximately two inches wide.

As shown in FIG. 2, the front sheet 14 may have one or more pockets 32 on its outer surface, for holding baby paraphernalia or small things. The pocket 32 is preferably sewn onto the front sheet 14 and may have a recloseable or buttonable top.

The rear sheet 12 has one or more apertures 41–45 as shown in FIG. 1. As shown in FIG. 3, these apertures 41–45 are adapted to allow the harness elements 50 of a child car seat 52 to pass through the rear sheet 12 and fasten around the child 18. In a receiving blanket 10 for use with child car seats 52 having a three-point restraint system, three apertures 41, 42, 45 may be used. A receiving blanket 10 for use with seats 52 having five-point restraint systems may require five apertures 41–45 as shown in FIG. 1.

The apertures 41–45 are located so that when the blanket 10, having the child 18 within its compartment 16, is placed on the seat 52, the harness elements 50 can pass easily through the apertures 41–45 and fasten around the child 18. In the preferred embodiment shown in FIG. 1, the first and second apertures 41, 42 are located 23 inches from the bottom edge 20 of the rear sheet 12, and are 6 inches left and right, respectively, from the vertical centerline of the rear sheet 12. The third and fourth apertures 43, 44 are located 17 inches from the bottom edge 20 of the rear sheet 12, and are also 6 inches left and right, respectively, from the vertical centerline of the rear sheet 12. The fifth aperture 45 is located 10 inches from the bottom edge 20 of the rear sheet 12, and is located along the vertical centerline of the rear sheet 12. Other arrangements of the apertures 41–45 are of course possible, to adapt the blanket 10 to different types of child car seats 52.

The apertures 41–45 may have any shape necessary to allow the harness elements 50 to pass through them, and may have a closed perimeter (like an oversized buttonhole) or an open perimeter (extending to one edge of the rear sheet 12). Preferably the apertures are thin, rectangular, and have closed perimeters, as shown in FIG. 1. Advantageously, the edges of the apertures 41–45 may have sewn borders or are otherwise strengthened to prevent ravelling or tearing. Where the rear sheet 12 is composed of a multiple-layer or quilted fabric, the apertures are most preferably formed by cutting thin rectangular openings in the front and rear layers of the rear sheet 12 such that the openings do not overlap;

thus when the blanket 10 is removed from the child car seat 52 the apertures 41–45 will close, ensuring that the child 18 is kept warm.

The apertures 41–45 may further be provided with fastening devices such as buttons, snaps, or Velcro (not shown in FIG. 1), to seal the apertures 41–45 when not in use.

In use, the blanket 10 may be placed on the child car seat 52, and the restraining harnesses 50 pulled through the apertures 41–45. The child 18 is then inserted into the compartment 16, using the recloseable opening 24 if necessary. The restraining harnesses 50 are fastened around the child 18, and the blanket 10 is then wrapped further around the child 18. Alternatively, the child 18 is first inserted into the compartment 16 and wrapped in the blanket 10, and then placed in the car seat 52. The blanket 10 is then unwrapped sufficiently to allow the restraining harnesses 50 to be pulled through the apertures 41–45 and secured around the child 18, and then the blanket 10 is re-wrapped around the child 18.

Similarly, to remove the child 18 from the car seat 52, the blanket 10 is unwrapped sufficiently to allow the restraining harnesses 50 to be separated, and then the child 18 is removed from the compartment 16 using the recloseable opening 24; the blanket 10 may be left in position on the car seat 52. Alternatively, to remove both child 18 and blanket 10, the blanket 10 may be unwrapped and the harnesses 50 separated, and then child 18 and blanket 10 are pulled from the car seat 52; the restraining harnesses 50 will pass through the apertures 41–45 as this is done.

Referring now to FIGS. 4 and 5, a second preferred embodiment of the present invention adapted for alternative use with a stroller or walker is shown. This second embodiment is similar in most respects to the first embodiment described above, and like elements in FIGS. 4 and 5 will be referenced with like numerals.

The front sheet 14 of the second embodiment of this invention is shaped to provide two leg extensions 60, 62 separated by a slot 64. The front sheet 14 is sewn or otherwise attached to the rear sheet 12 of the blanket 10 along both sides 28, 30 and around the perimeter of both leg extensions 60, 62 of the front sheet 14, forming a compartment 16 shaped to accept the torso and individual legs of a child 18. The rear sheet 12 has a corresponding slot 65 removed so that both slots 64, 65 overlap.

The slots 64, 65 are of a size and shape adapted to fit around the center post of a stroller or walker, allowing the leg extensions 60, 62 individually to pass through the leg-holes of the stroller. In addition, the slots 64, 65 may be adapted for use with a child car seat 52 having a harness 50 located between the child's legs. This second embodiment of the blanket 10 thus allows the restraint harness 50 to be fastened around both the child 18 and the blanket 10.

FIG. 5 shows an enlarged view of the front sheet 14 of the second preferred embodiment. In this embodiment two pockets 32 are sewn onto the front sheet 14, and two zippered openings 24 are located along the sides 28, 30 of the front sheet 14.

Figure 6:
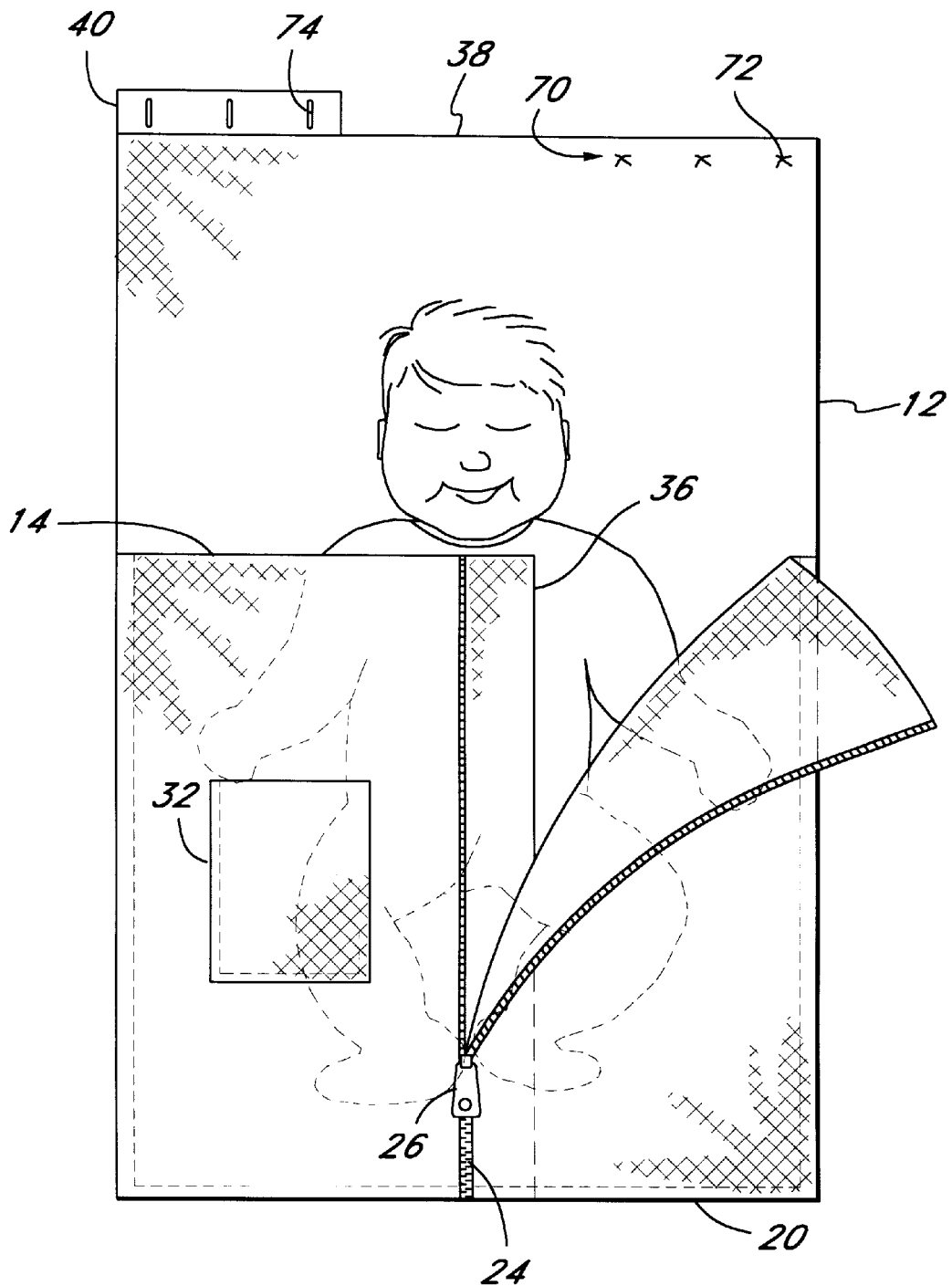
FIG. 6 is a front view of a third preferred embodiment of the present invention, illustrating the blanket and receiving compartment and button attachment for forming a hood, and a child held within the compartment.
Figure 7:
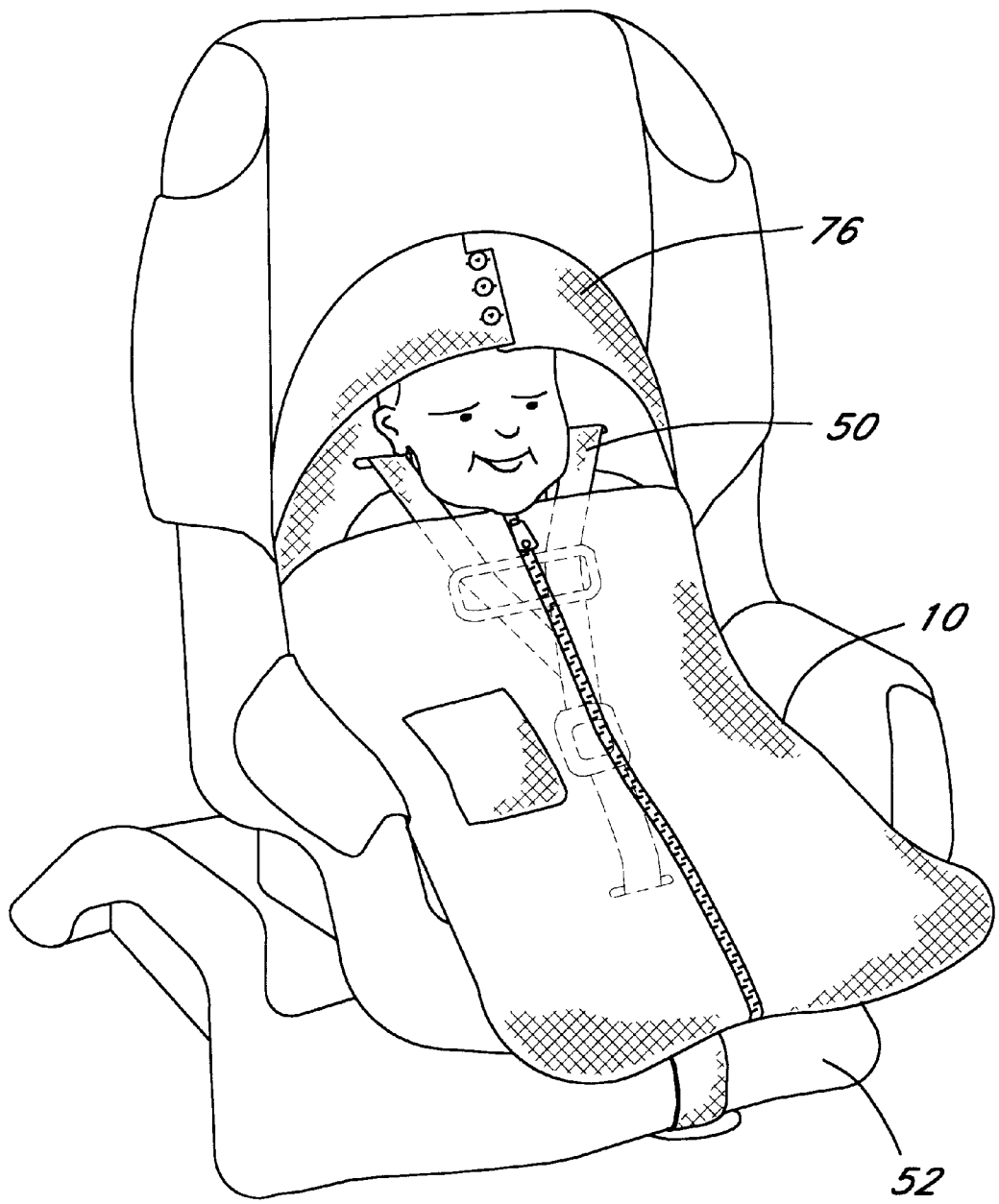
FIG. 7 is a perspective view of the blanket of the third preferred embodiment, showing its use with a child car seat having a restraint system, and illustrating the hood in the buttoned and closed position.

FIGS. 6 and 7 show a third preferred embodiment of this invention, having a rectangular rear sheet 12 and a front sheet 14 similar in most respects to the front sheet 14 of the first preferred embodiment. In this third embodiment, the rear sheet 12 is provided with a set of fasteners 70, such as buttons, snaps, laces, Velcro, or a zipper, along a top edge 38 of the rear sheet 12. Preferably, as shown in FIG. 6, the fasteners 70 are a row of buttons 72 and buttonholes 74. The buttons 72 and buttonholes 74 may be located on the rear sheet 12 itself, or preferably, as shown in FIG. 6, the buttonholes 72 may be located on a small fabric extension 40 extending upward from the top edge 38 of the rear sheet 12. In the embodiment shown in FIG. 6, the extension 40 is approximately one inch tall.

Referring now to FIG. 7, when fastened together the buttons 72 and buttonholes 74 cause the top of the rear sheet 12 to form a small hood 76 for the head of the child 18.

What is claimed is:

1. A baby blanket which is adapted for use with a baby or infant car seat having a plurality of restraining members which are affixed to the car seat and which can be releasably secured to each other to provide a restraining harness around a child placed in the seat, the blanket comprising a rear sheet having at least three aperture forming means formed therein and located to allow the restraining members of the car seat to pass through the apertures formed thereby with one of said aperture forming means being disposed in a lower central area of said rear sheet in the area of the crotch of the baby when the baby is disposed on said rear sheet and at least two of said aperture forming means being disposed above and on the sides of said one aperture forming means and on the upper sides of the torso of the baby when disposed on said rear sheet and a front sheet which is attached to the rear sheet, forming an open-topped compartment between the front sheet and the rear sheet for containing and holding the baby, said rear sheet aperture forming means permitting the restraining members to be secured about the baby while the baby is swaddled in said blanket compartment and for retaining said baby and said baby blanket in position in said car seat, said rear sheet including one or more fasteners placed at the top of said rear sheet for forming a hood over the head of the infant.

2. A baby blanket as set forth in claim 1, wherein the compartment has a recloseable opening for ease in inserting or removing the infant into or from the compartment.

3. A baby blanket as set forth in claim 1, wherein the rear sheet has a generally diamond shape with the bottom corner truncated to form a bottom edge and the front sheet is generally rectangular about one-eighth to about one-fourth the area of the rear sheet and having a top edge, a bottom edge substantially as long as, and attached to, the bottom edge of the rear sheet, and two sides which are attached to the rear sheet forming the open-topped compartment between the front sheet and the rear sheet.

4. The baby blanket of claim 1, wherein there are only three aperture forming means.

5. The baby blanket of claim 1, wherein there are at least five aperture forming means.

6. The baby blanket of claim 1, wherein the rear sheet is substantially rectangular.

7. The baby blanket of claim 1, wherein the front sheet is substantially rectangular.

8. The baby blanket of claim 1, wherein the front sheet has left and right extensions separated by a slotted opening leading vertically from the bottom edge of the front sheet, the rear sheet has a slotted opening overlapping the slotted opening in the front sheet, and the extensions form cavities between the front sheet and the rear sheet adapted to receive the legs of an infant or small child.

9. The baby blanket of claim 1, wherein the fasteners are a row of buttons and holes located at the top of the rear sheet.

10. The baby blanket of claim 1, wherein the front sheet includes one or more pockets for holding small items.

* * * * *